United States Patent [19]

Brandenstein et al.

[11] Patent Number: 4,888,862

[45] Date of Patent: Dec. 26, 1989

[54] METHOD FOR INSTALLING BEARING RINGS

[75] Inventors: Manfred Brandenstein, Eussenheim; Herrmann Hetterich, Heidenfeld, both of Fed. Rep. of Germany

[73] Assignee: SKF GmbH, Fed. Rep. of Germany

[21] Appl. No.: 128,733

[22] Filed: Dec. 4, 1987

[30] Foreign Application Priority Data

Dec. 10, 1986 [DE] Fed. Rep. of Germany ....... 3642115

[51] Int. Cl.⁴ .............................................. B21K 1/02
[52] U.S. Cl. .......................... 29/148.4 A; 29/148.4 D; 29/510; 29/515; 29/520; 384/585
[58] Field of Search ................. 29/110, 123, 125, 129, 29/148.4 A, 148.4 D, 149.5 C, 243.52, 509, 510, 515, 520, 724, 725; 384/537, 584, 585

[56] References Cited

U.S. PATENT DOCUMENTS

| | | | |
|---|---|---|---|
| 2,010,569 | 8/1935 | Sitzler | 29/520 |
| 2,366,663 | 1/1945 | Weigel | 29/510 X |
| 2,494,213 | 1/1950 | Sylvester et al. | 29/510 X |
| 3,307,893 | 3/1967 | Williams | 384/585 |
| 3,639,019 | 2/1972 | Schaeffler | 384/537 |
| 4,344,218 | 8/1982 | Hopper et al. | 29/148.4 D X |
| 4,735,300 | 4/1988 | Brown | 29/520 X |

FOREIGN PATENT DOCUMENTS 3412169 10/1985 Fed. Rep. of Germany.

*Primary Examiner*—P. W. Echols
*Assistant Examiner*—Andrew E. Rawlins
*Attorney, Agent, or Firm*—Eugene E. Renz, Jr.

[57] ABSTRACT

A method for assembling bearing rings in an elongated sleeve member consisting of the steps of forming a roller shell with three sections of varying wall thicknesses separated by angular circumferentially extending shoulders, deforming the shoulder between the middle section and one end section to form a ring-shaped radially, inwardly directed projection by axial displacement of the shoulder. A bearing ring is inserted in the interior of the shell member so that one axial end face engages the first radially oriented projection formed and deforming the shoulder between the middle section and the other end section to form a second radially inwardly directed projection by axial displacement of the shoulder which confronts the opposite axial end face of the bearing ring.

2 Claims, 1 Drawing Sheet

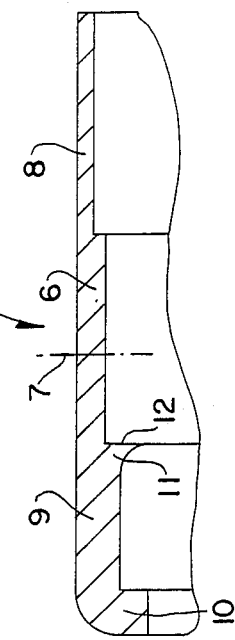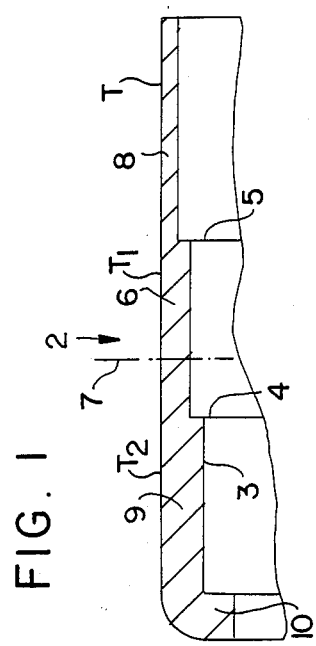

METHOD FOR INSTALLING BEARING RINGS

FIELD OF THE INVENTION

The present invention relates to new and useful improvements in method and system fro installing bearing rings.

BACKGROUND OF THE INVENTION

West German Patent No. 3,412,169 shows typical prior art of the general type to which the present invention relates. This patent shows a tension roller with a thin-walled roller shell of metal wherein one of the end sections is folded over and forms a rearward facing sleeve in the bore having an edge against which the bearing ring of the roller bearing abuts. Radial projections facing the lateral surface of the bearing ring are formed on the opposite sie of the sleeve. Even though this arrangement provides a good attachment between the bearing ring and the roller shell, the roller shell and elements project axially in both directions a considerable extent. This arrangement is designed for a relatively wide drive belt. Even though the tension roller functions generally satisfactorily, there are ways in which the production of this type of assembly can be made more economical. It has been found that production of these assemblies is rather costly and could be improved from an economic viewpoint. For example, formation of the folded-back end section involveds complicated, intricate procedures. It has been found that when this section is omitted and the bearing ring is simply attached by means of radial projections formed on both ends, the bearing ring must be positioned precisely to prevent the roller shell from wobbling and to provide the necessary axial symmetry of the entire unit. This is possible only when additional positioning devices are used for installation. Furthermore, relatively thin-walled roller shells present problems if they are not provided with outward facing flanges to stabilize them. In these instances, the flanges must face inward to provide the reinforcement of the edge areas. This rather complicated arrangement hinders the use of tools needed to form the radial projections for installation.

SUMMARY OF THE INVENTION

With the foregoing in mind, an object of the present invention is to provide a method and system for installing bearing rings of the type described above wherein it is possible to mount the bearing ring reliably without the need for positioning the ring in a complicated manner in a prefabricated roller shell, particularly in the case of thin-walled roller shells. To this end, and in accordance with the present invention, the roller shell is produced with a wall thickness graduated in three stages which defines a middle seating section for the bearing ring of intermediate wall thickness, a first adjacent end section of greater wall thickness and at the opposite end, a second and section of lesser wall thickness. A ring-shaped radially directed projection is produced by cold deformation and specifically by axially displacing the shoulder between the middle seating section and the end section of greater wall thickness. The bearing ring is then inserted up to the radially directed projection so formed and thereafter a second radial projection is produced by cold deformation between the middle seating section and the second end section of lesser wall thickness toward the seating surface of the bearing ring. This cold deformation is likewise achieved by axially displacing the shoulder.

The roller shell which may be prefabricated, for example, from a sectio of tubing formed by the method described above thus is characterized by a configuration including a stepped bore surface with graduated diameters. The middle seating section between the two shoulders forming the transition areas is as wide as a bearing ring and defines a seat for the bearing ring. The center section is shifted overall from the center in the direction of the thin-walled end section by the axial distance to which later the shoulders will be displaced by cold deformation. Then the shoulder between the seating section and the thicker walled first end section is displaced axially by a predetermined distance by cold forming utilizing a tool in the shape, for example, of a disk. The material of the roller shell is displaced radially inwardly and forms a ring-shaped closed projection with a precise radial surface against which the bearing ring abuts.

In accordance with the method of the present invention, the radial height of the projection can be calculated in advance. However, there is no problem of producing an appropriate height which projects beyond the conventional reduced area or chamfer on the bearing ring. However, to produce a precise, properly-shaped projection, the material of the shell can, if required, be displaced against a disk-shaped die with a slightly conial forming surface which is positioned in the roller shell from the rear. In this manner, a slightly densified ring-shaped projection of uniform predetermined height is produced when the bearing ring or the entire bearing is inserted and displaced in the axial direction until it abuts against the projection formed by the above process. On the opposite end of the shell, there is enough material left in the seating section in the axial direction beyond the lateral surface so that a projection can be formed from it in the final step of installation. The second shoulder is displaced axially toward the lateral surface of the bearing ring by means of a second tool which can also have the shape of disk, for example. The final installation process is similar to that described above and, as a result, a ring-shaped radial projection is formed from the material which is deformed by a suitably high pressure until it rests firmly against the lateral axial end face or surface of the bearing ring. The forming surface of the second tool can be slightly conical and thereby achieve a high degree of densification of the projection to prevent the material from flowing too great a distance in the radial direction. Installation of a bearing ring in accordance with the method and system of the present invention results in a highly precise alignment of the bearing ring. Furthermore, the concentricity of the roller shell and axially symmetric position of the bearing ring therein are obtained automatically without any separate adjusting measures needed by reason of th fact that during formation of the first ring-shaped projection, a perfect radial reference surface which serves to position the bearing ring is created no matter what the tolerance conditions.

Because of the extremely dimensionally stable, closed, ring-shaped radial projections, the installation is extremely stable even when thin-walled materials are used, and it remains rigid and consistently tight over the entire service life of the unit. The uniform projections provided around the circumference reliably prevent the roller shell from being deformed into a noncircular shape. The possibility of using thin-walled starting material prevents the unallowable deformation of the bearing ring in the case of deviations from circularity in the prefabricated roller shell, because it is easier for thinner walls to adapt to the precise form of the bearing ring. The roller shell can be designed essentially as a cylinder, or its end sections can project outwardly.

The end regions can also be deformed radially inwardly to provide radial stabilization in accordance with another feature of the present invention.

BRIEF DESCRIPTION OF THE DRAWINGS

These and other objects of the present invention and the various features and details of the method and system of the present invention are hereinafter more fully set forth with reference to the accompanying drawings, wherein:

FIG. 1 is a longitudinal cross-sectional view of a roller shell produced, for example, from a section of tubing by a process of downward stretching;

FIG. 2 is a sectional view similar to FIG. 1 showing formation of one of the ring-shaped projections by cold deformation;

FIG. 3 is still another fragmentary, longitudinal sectional view similar to FIGS. 1 and 2 showing a further development of the roller shell in accordance with the present invention; and FIG. 4 shows the finished formed shell with the bearing mounted in place.

DESCRIPTION OF THE PREFERRED METHOD AND SYSTEM

Referring now to the drawings, and particularly to FIG. 1 thereof, there is shown part of a roller shell 2 produced, for example, from a section of tubing by process of downward stretching to define a three-stepped bore surface 3 with shoulders 4 and 5 at each of the transition points. The central section 6 thus formed defines a seat for a bearing ring 1 and as illustrated in FIG. 1, is shifted somewhat to the right with respect to the line of axial symmetry 7. The first end section 8 projecting from one end of the seating section 6 has a thinner wall section T than the cross-section $T_1$ of the seating section. The opposing end section 9 projecting from the opposite side of the seating section 6 has a wall section which is of greater cross-section $T_2$ than the seating section and the first end section. The second end section 9 has a turned-in edge 10 defined by a flange which faces radially inwardly.

After formation of the roller shell 2 in the manner described above, the shoulder 4 is displaced axially in a succeeding process step by cold deformation of this area of the roller shell 2. The cold deformation in this area produces a radially inwardly facing ring-shaped, closed projection 11 having a radially extending contact surface 12 confronting and engaging one axial end face 14 of the bearing ring to be assembled therein in a later step in the assembling process. After insertion of the bearing ring in the manner shown in FIG. 3, the shoulder 5 is displaced axially against the bearing ring by means of another tool (not shown) having a slightly conical deformation surface. In this deformation process step, a radially inwardly facing closed ring-shaped projection 16 is produced which confronts and abuts the opposite axial end face or lateral surface 15 of bearing ring 1. As shown in FIGS. 3 and 4, bearing ring 1 is thus mounted axially and radially in a form-locking manner to roller shell 2. It is noted that projection 11 extends radially far enough beyond edge bevel 13 of bearing ring 1 to provide a large contact surface area against which the one axial end face or lateral surface 14 of bearing ring 1 abuts.

Thereafter, in a next processing step, the edge 17 of end section 8 is deformed radially inwardly to provide better stabilization. In this manner, bearing ring 1 is ultimately axially symmetric with respect to roller shell 2.

Even though, a particular process, method, and system has been described herein, it is not intended to limit the invention and changes and modifications may be made therein within the scope of the following claims. For example, bearing rings or the like can also be installed on the lateral surface of a sheet metal sleeve of any type whatsoever in the same way to achieve the advantages of the present invention described above.

SUMMARY

For the installation of a bearing ring 1 in a thin-walled sheet metal sleeve 2, a section of tubing with three-stepped bore surface 3 is prefabricated. The middle region forms the seating section 6 for bearing ring 1. This section continues on one side as a section with thicker walls and on the other side as a section with thinner walls to the free ends of sheet metal sleeve 2. First, shoulder 4 between the seating section and the thicker end section is displaced axially to form a ring-shaped, radially oriented projection 11 as a contact surface for bearing ring 1 by means of cold deformation. After bearing ring 1 has been inserted, the second shoulder 5 is axially displaced, by which means a second radially oriented, ring-shaped projection 16 is formed against the second lateral surface 15 of bearing ring 1. Bearing ring 1 is thus precisely positioned and installed in a stable and form-locked manner. In addition, edges 10, 17 can also be deformed radially.

What is claimed is:

1. Method for assembling bearing rings having opposing axial end faces in an elongated sleeve member consisting of the steps of
   (a) forming a roller shell with three sections of varying wall thicknesses separated by annular circumferentially extending shoulders,
   (b) deforming the shoulder between the middle section and one end section to form a ring-shaped radially, inwardly directed projection by axial displacement of the shoulder,
   (c) inserting a bearing ring in the interior of the shell membmer so that one axial end face engages the first radially oriented projection formed,
   (d) deforming the shoulder between the middle section and the opposite end section to form a second radially inwardly directed projection by axial displacement of the shoulder which confronts the other axial end face of the bearing ring, and
   (e) flanging over the edge of the roller shell in the area of the end section of greater wall thickness to form a ring-shaped, radial flange during prefabrication of the roller shell.

2. Method for assembling bearing rings having opposing axial end faces in an elongated sleeve member consisting of the steps of
   (a) forming a roller shell with three sections of varying wall thicknesses separated by annular circumferentially extending shoulders,
   (b) deforming the shoulder between the middle section and one end section to form a ring-shaped radially, inwardly directed projection by axial displacement of the shoulder,
(c) inserting a bearing ring in the interior of the shell member so that one axial end face engages the first radially oriented projection formed,
(d) deforming the shoulder between the middle section and the opposite end section to form a second radially inwardly directed projection by axial displacement of the shoulder which confronts the other axial end face of the bearing ring, and
(e) flanging over the edge of the roller shell in the area of the end section of lesser wall thickness to form a ring-shaped, radial flange.

* * * * *